(12) United States Patent
King et al.

(10) Patent No.: US 6,591,563 B2
(45) Date of Patent: Jul. 15, 2003

(54) PANEL SYSTEM

(75) Inventors: Jonathan J. King, East Grand Rapids, MI (US); Joel T. Ruiter, Grand Haven, MI (US); David J. Dekkar, Holland, MI (US); James D. Houda, Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 39 days.

(21) Appl. No.: 09/881,833

(22) Filed: Jun. 15, 2001

(65) Prior Publication Data

US 2002/0189180 A1 Dec. 19, 2002

(51) Int. Cl.$^7$ ................................................ E04F 19/06
(52) U.S. Cl. ......................... 52/243; 52/220.7; 52/36.1; 52/220.2
(58) Field of Search ................. 52/220.7, 243, 52/239, 243.1, 220.2, 36.1; 174/48

(56) References Cited

U.S. PATENT DOCUMENTS

| | | | |
|---|---|---|---|
| 2,812,220 A | 11/1957 | King | |
| 3,001,615 A | 9/1961 | Ries | |
| 3,164,353 A | 1/1965 | René | |
| 3,213,965 A | 10/1965 | Fedoryk | |
| 3,377,756 A | * 4/1968 | Polhamus | 138/166 |
| 3,802,146 A | 4/1974 | Tacke et al. | |
| 3,834,093 A | 9/1974 | Tacke et al. | |
| 3,916,972 A | 11/1975 | Breiner | |
| 3,958,386 A | 5/1976 | Pollock | |
| 3,983,822 A | 10/1976 | Suttles | |
| 4,204,480 A | 5/1980 | Hanna | |
| 4,415,091 A | 11/1983 | Wolff | |
| 4,455,007 A | 6/1984 | Varon et al. | |
| 4,467,925 A | 8/1984 | Ratzloff et al. | |
| 4,508,300 A | 4/1985 | Minick | |
| 4,542,832 A | 9/1985 | Minick et al. | |
| 4,605,988 A | 8/1986 | Nienhuis et al. | |
| 4,631,881 A | * 12/1986 | Charman | 160/135 |
| 4,713,918 A | 12/1987 | Cioffi | |
| 4,716,698 A | 1/1988 | Wilson et al. | |
| 4,795,355 A | 1/1989 | Dorn et al. | |
| 4,881,349 A | 11/1989 | Brown et al. | |

(List continued on next page.)

FOREIGN PATENT DOCUMENTS

WO     WO00021412     10/1999

OTHER PUBLICATIONS

Exhibit A is a brochure entitled *Resolve™ System*, Herman Miller Inc., published at least as early as Dec., 2001.

*Primary Examiner*—Carl D. Friedman
*Assistant Examiner*—Basil Katcheves
(74) *Attorney, Agent, or Firm*—Price, Heneveld, Cooper, DeWitt & Litton

(57) ABSTRACT

A partition panel includes a rigid panel frame having a lower portion configured to support the partition panel freestanding on a floor surface. The rigid panel frame defines a horizontal upper edge and an intermediate height between the upper edge and the lower portion. A utility trough extends horizontally adjacent the horizontal upper edge, and the utility trough defines a utilities passageway having an upwardly facing elongated opening extending along substantially the entire length of the utility trough and providing access to the utilities passageway. A horizontally repositionable vertically extending utility support member is adapted to support utility lines extending from the utilities passageway of the utility trough to the intermediate height. The utility support member is supported by the panel frame at a selected one of a plurality of horizontal positions, such that the utility support member can be readily positioned at a desired horizontal location with utility lines extending through the elongated opening adjacent an upper end of the utility support member, along the utility support member down to the intermediate height.

20 Claims, 3 Drawing Sheets

U.S. PATENT DOCUMENTS

| | | | | |
|---|---|---|---|---|
| 4,905,428 A | | 3/1990 | Sykes | |
| 4,914,873 A | | 4/1990 | Newhouse | |
| 4,928,832 A | | 5/1990 | Overmann | |
| 4,953,879 A | | 9/1990 | Cain et al. | |
| 5,062,246 A | | 11/1991 | Sykes | |
| 5,070,666 A | | 12/1991 | Looman | |
| 5,086,606 A | | 2/1992 | Finses | |
| 5,160,154 A | | 11/1992 | Seydel et al. | |
| 5,197,614 A | | 3/1993 | Dalton et al. | |
| 5,207,037 A | | 5/1993 | Giles et al. | |
| 5,212,918 A | | 5/1993 | Newhouse et al. | |
| 5,271,585 A | | 12/1993 | Zetena, Jr. | |
| 5,277,007 A | | 1/1994 | Hellwig et al. | |
| 5,316,244 A | | 5/1994 | Zetena, Jr. | |
| 5,357,055 A | * | 10/1994 | Sireci | 174/48 |
| 5,362,923 A | | 11/1994 | Newhouse et al. | |
| 5,394,658 A | | 3/1995 | Schreiner et al. | |
| 5,464,104 A | | 11/1995 | McArthur | |
| 5,472,103 A | | 12/1995 | Merl | |
| 5,474,402 A | | 12/1995 | Wu | |
| 5,479,747 A | | 1/1996 | Wu | |
| 5,586,593 A | | 12/1996 | Schwartz | |
| 5,660,286 A | | 8/1997 | Shea | |
| 5,724,779 A | | 3/1998 | Chang | |
| 5,737,893 A | | 4/1998 | Rossiter et al. | |
| 5,738,019 A | | 4/1998 | Parker | |
| 5,743,052 A | | 4/1998 | Mayhall et al. | |
| 5,769,248 A | | 6/1998 | Johnson | |
| 5,831,211 A | | 11/1998 | Gartung et al. | |
| 5,875,596 A | | 3/1999 | Muller | |
| 5,910,351 A | | 6/1999 | Davis et al. | |
| 5,943,834 A | | 8/1999 | Jeffers et al. | |
| 5,955,170 A | | 9/1999 | Davis et al. | |
| 5,957,422 A | | 9/1999 | Shea | |
| 5,974,742 A | | 11/1999 | Schreiner et al. | |
| 5,976,663 A | | 11/1999 | Davis et al. | |
| 5,986,212 A | | 11/1999 | Lhota | |
| 5,989,676 A | | 11/1999 | Davis et al. | |
| 6,037,538 A | | 3/2000 | Brooks | |
| 6,044,612 A | | 4/2000 | Shipman et al. | |
| 6,070,747 A | | 6/2000 | Shea | |
| 6,082,065 A | | 7/2000 | Feldpausch | |
| 6,098,358 A | * | 8/2000 | Waalkes et al. | 52/239 |
| 6,101,773 A | * | 8/2000 | Chau et al. | 174/48 |
| 6,112,472 A | * | 9/2000 | Van Dyk et al. | 52/220.7 |
| 6,161,347 A | | 12/2000 | Yu et al. | |
| 6,164,467 A | | 12/2000 | DePottey et al. | |
| 6,173,543 B1 | * | 1/2001 | Gortsema et al. | 211/26 |
| 6,196,140 B1 | * | 3/2001 | Newhouse et al. | 108/147.11 |

* cited by examiner

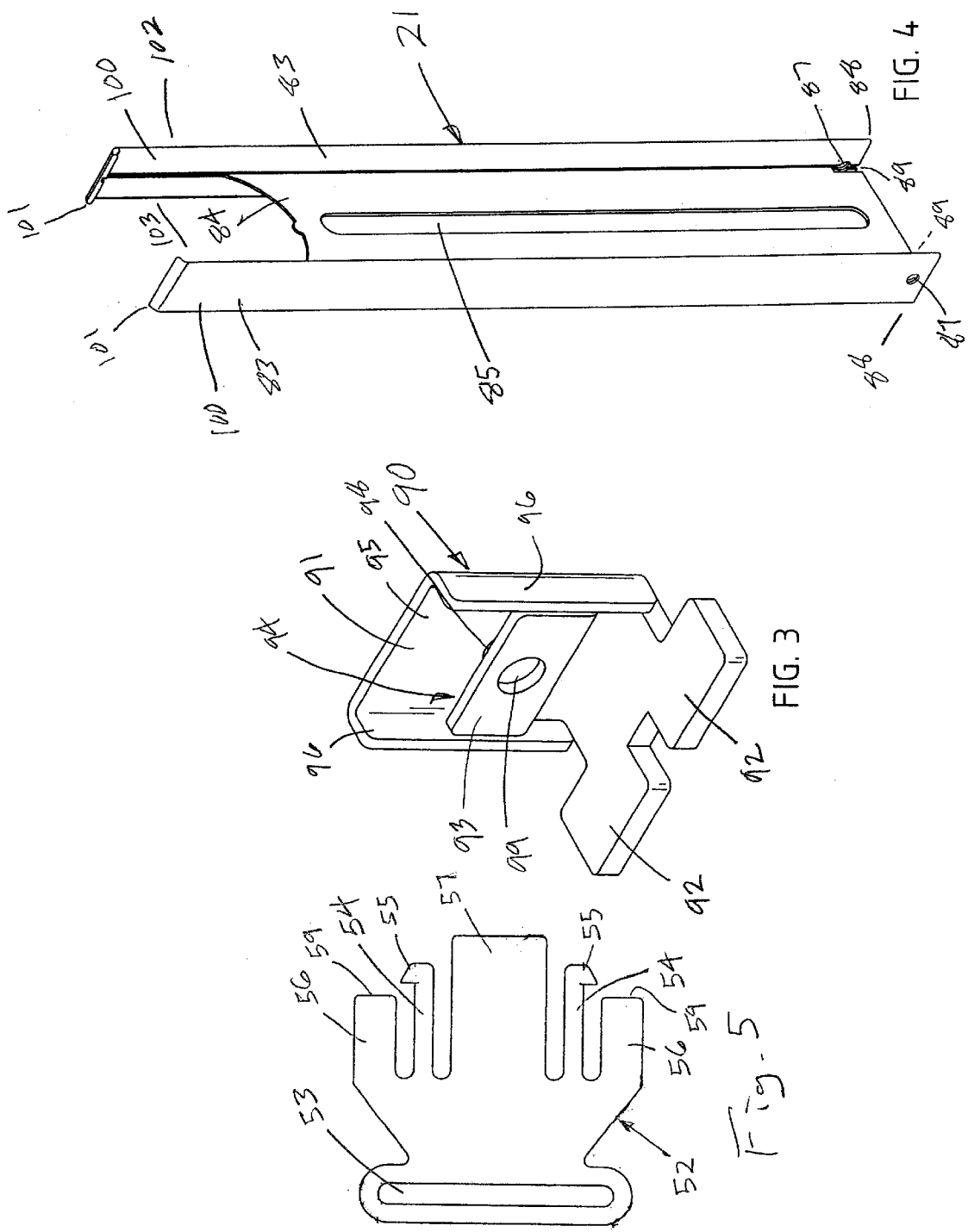

PANEL SYSTEM

BACKGROUND OF THE INVENTION

Modern offices are becoming increasingly complicated and sophisticated due largely to the ever increasing needs of the users for improved utilities support at each workstation, such as communications, computers and other types of data processors, electronic displays, etc., including physical accommodations, such as lighting, HVAC, security, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving incredibly complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will find their place in the workplaces of the future.

One important consequence of the advent of sophisticated electronic offices is the increased need and desirability for distributing utilities throughout the various offices in a manner which can be readily reconfigured. The term "utilities" as used herein incorporates a wide variety of facilities for use at a workstation, including security devices, electrical power, signal and/or communications, HVAC, water and other fluids, and other similar resources. The ability to provide the worker with ready access to all of these utilities is clearly advantageous in the quest to promote worker well being and effectiveness.

The efficient use of building floor space is also an ever growing concern, particularly as building costs continue to escalate. Open office plans have been developed to reduce overall officing costs, and generally incorporate large, open floor spaces in buildings that are equipped with modular furniture systems which are readily reconfigurable to accommodate the ever changing needs of a specific user, as well as the divergent requirements of different tenants. One arrangement commonly used for furnishing open plans includes movable partition panels that are detachably interconnected to partition off the open spaces into individual workstations and/or offices. Such partition panels are configured to receive hang-on furniture units, such as worksurfaces, overhead cabinets, shelves, etc., and are generally known in the office furniture industry as "systems furniture". Another arrangement for dividing and/or partitioning open plans includes modular furniture arrangements, in which a plurality of differently shaped, freestanding furniture units are positioned in a side-by-side relationship, with upstanding privacy screens attached to at least some of the furniture units to create individual, distinct workstations and/or offices. Both of these types of modular furniture systems, as well as others, have been widely received due largely to their ability to be readily reconfigured and/or moved to a new site, since they are not part of a permanent leasehold improvement.

In order to gain increased efficiency in the use of expensive office real estate, attempts are now being made to try to support high paid knowledge workers with these types of modular furniture systems in open office settings, instead of conventional private offices. However, in order to insure peak efficiency of such knowledge workers, the workstations must be equipped with the various state-of-the-art utilities and facilities discussed above. Since such workstations must be readily reconfigurable to effectively meet the ever changing needs of the user, the distribution and control of utilities throughout a comprehensive open office plan has emerged as a major challenge to the office furniture industry.

At present, some types of modular furniture systems, such as selected portable partition panels and freestanding furniture units can be equipped with an optional powerway, which extends along the entire width of the unit, and has quick-disconnect connectors adjacent opposite ends thereof to connect with adjacent, like powerways, and thereby provide electrical power to an associated furniture group or cluster. Outlet receptacles are provided along each powerway into which electrical appliances can be plugged. Cable troughs or channels are also provided in most such furniture units, so as to form a system of interconnected raceways into which signal and communications wires can be routed. Such cabling is normally routed through the furniture system after the furniture units are installed, and is then hard wired at each of the desired outlets. While this type of distribution system has proven somewhat effective, the types of utilities provided are rather limited, and their distribution is not wholly modular, thereby resulting in higher installation and reconfiguration costs. The inherent nature of modular furniture systems, which permits them to be readily reconfigured into different arrangements, makes it very difficult to achieve adequate utility distribution.

Various difficulties may be encountered when routing utility lines through known systems. For example, if the utility lines are routed along the upper edge of the partition panel, the utilities will need to change height at each location wherein adjacent partition panels of different heights are utilized. Various end caps and transitions have been developed. However, such arrangements generally add to the complexity and/or cost of the system. Furthermore, difficulty may be encountered when routing a large volume of wires through such a change of height location.

SUMMARY OF THE INVENTION

One aspect of the present invention is a partition panel including a rigid panel frame having a lower portion configured to support the partition panel freestanding on a floor surface. The rigid panel frame defines a horizontal upper edge and an intermediate height between the upper edge and the lower portion. A utility trough extends horizontally adjacent the horizontal upper edge, and the utility trough defines a utilities passageway having an upwardly facing elongated opening extending along substantially the entire length of the utility trough and providing access to the utilities passageway. A horizontally repositionable vertically extending utility support member is adapted to support utility lines extending from the utilities passageway of the utility trough to the intermediate height. The utility support member is supported by the panel frame at a selected one of a plurality of horizontal positions, such that the utility support member can be readily positioned at a desired horizontal location with utility lines extending through the elongated opening adjacent an upper end of the utility support member, along the utility support member down to the intermediate height.

Another aspect of the present invention is a partition panel for spatially dividing an interior building space. The partition panel includes a rigid partition frame including a lower portion configured to support the partition frame on a floor surface in an upright position. The rigid partition frame defines a generally horizontal upper edge. An electrical powerway is adapted to conduct electricity. The electrical powerway extends along a lower portion of the partition frame, and includes at least one power outlet positioned adjacent the lower portion of the partition frame. The partition panel includes an upper communications raceway extending generally horizontally adjacent the upper edge of the partition frame and including at least one communications line extending along the communications raceway. An intermediate support member is positioned between the lower portion and the upper edge. The intermediate support member is adjustably connected to the rigid partition frame such that the intermediate support member can be supported by the rigid partition frame at a selected one of a plurality of vertically spaced locations. An electrical power receptacle is electrically connected to the electrical powerway and supported on the intermediate support member. A communications receptacle is operably connected to the communications line and is also supported on the intermediate support member.

Yet another aspect of the present invention is an office environment partition system for spatially dividing an interior space having a floor and for supporting furniture units. The partition system includes a partition panel having a rigid frame with a height and a width. The rigid frame is repositionably located on a floor. The rigid frame includes at least two vertical members having attachment sites extending along a portion of the vertical length of each of the vertical members. The attachment sites are configured to provide the selective mounting of the furniture units thereto. The partition panel includes an electrical power raceway operably connected to the electrical power outlets and accessible from the exterior of the panel partition. A support member is detachably secured to the attachment sites, and has a horizontal length extending between the two vertical members. The support member is vertically repositionable at selected heights on the partition panel. The partition system also includes an electrical power outlet housing assembly detachably supported by the support member. The housing is repositionable along a substantial portion of the horizontal length of the support member. The electrical power outlet housing is operably connectable to the electrical power raceway whereby electrical power is supplied to the electrical power outlet housing assembly from the electrical power raceway.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is a perspective view of a bracket that connects the trestle of FIG. 4 to the partition panel frame;

FIG. 4 is a perspective view of a trestle that supports the utility trough above the partition panel frame; and FIG. 5 is a top plan view of the retainer of FIG. 2.

DETAILED DESCRIPTION OF PREFERRED EMBODIMENT

Figure 1:
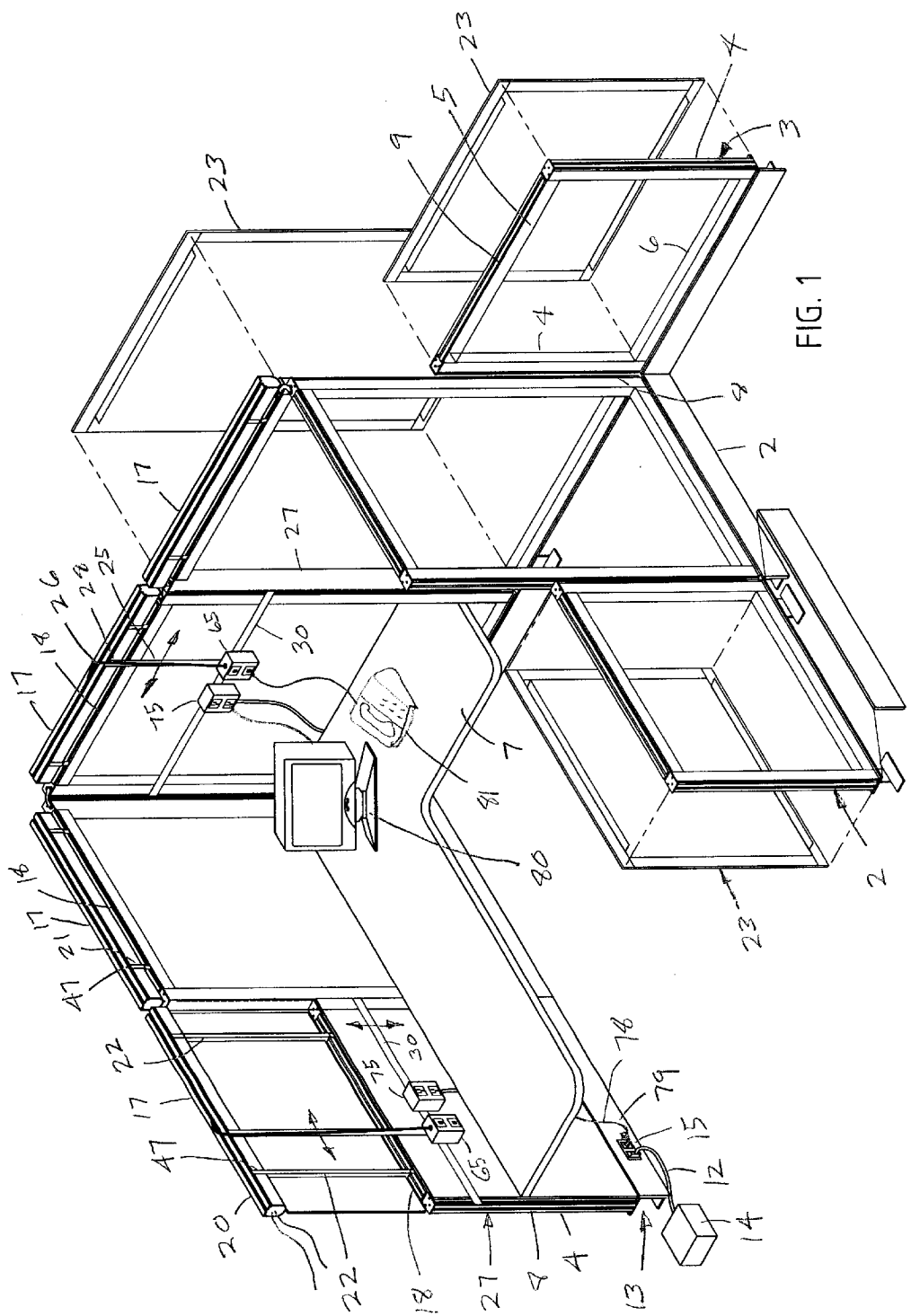
FIG. 1 is a partially exploded perspective view of a partition panel system embodying one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, partition system 1 includes one or more partition panels 2, each of which includes a partition frame 3. Each partition frame 3 includes a pair of spaced apart upright vertical frame members 4, and upper horizontal frame member 5, and a lower horizontal frame member 6. Vertical frame members 4 include a vertical row of apertures 8 adapted to removably support hang-on accessories, such as worksurface 7, binder bins (not shown), or the like. Upper horizontal frame member 5 has substantially the same cross-sectional shape as vertical frame members 4, and includes a horizontal row of apertures 9. Each partition panel 2 includes a pair of feet 10, each of which includes a conventional threaded glide 11 to provide height adjustment for the partition panel 2. The lower horizontal frame member 6, feet 10 and threaded glide 11 are substantially similar to the existing Steelcase Avenir® panel system, and will therefore not be described in detail herein. An electrical powerway 12 extends along the base 13 of the partition panels 2 and includes a standard inlet box 14 or other known arrangement to provide power to the partition system 1. The powerway 12 includes one or more power outlet receptacles 15 positioned along base cover 16. Electrical powerway 12 is substantially similar to an existing Steelcase Avenir® powerway, and will not therefore be described in detail herein.

A utility trough 17 extends horizontally adjacent an upper edge 18 of the partition frame 3. Each utility trough 17 defines a utilities passageway 19, and includes an upwardly facing elongated opening 20 extending along substantially the entire length of the utility trough 17 to provide access to the utilities passageway 19. One or more trestles or supports 21 connect to the horizontal row of slots 9, and support the utility troughs adjacent the upper edges 18 of the partition frames 3. Longer trestles or supports 22 may also be utilized to support a utility trough 17 adjacent an upper edge 18 of a partition frame 3, such that adjacent utility troughs 17 are supported at substantially the same height despite the differing heights of the adjacent partition panels 2.

With further reference to FIG. 4, trestle 21 has a generally "H" cross-sectional shape formed by outer webs 83 and center web 84. An elongated slot 85 in center web 84 may be utilized to receive a vertical screen 86 (FIG. 1) if desired for a particular application. Threaded openings 87 are located adjacent the lower ends 88 of outer webs 83, and cutouts 89 in center web 84 provide clearance for a threaded fastener. A hooked bracket 90 (FIG. 3) includes a pair of hooks 92 that are received in selected horizontal apertures 9. An upright portion 91 extends upwardly from the hooks 92, and has a shallow U-shaped cross section. A small cross piece 93 extends between the legs 96 of the upright portion 91, and is spaced apart from web 95 of upright portion 91 to form a gap 94. During assembly, hooks 92 of bracket 90 are inserted into apertures 9, and the lower end 88 of outer webs 83 of trestle 21 are inserted into the gap 94 with the threaded openings 87 in alignment with the clearance openings 98 and 99 of bracket 90. A threaded fastener 90 is then threaded into the threaded openings 87 to secure the trestle 21 in the upright position. Web 84 is cut away at the upper end 102 of trestle 21 to form a pair of upright extensions 100, each of which includes an inwardly turned upper edge 101. During assembly, utility trough 17 is slid downwardly into the gap 103 between extensions 100, until the upper ends 101 are received in the grooves 45. Utility trough 17 is preferably made of a somewhat flexible material, such that side walls 46 flex inwardly, closing the elongated opening 20 somewhat during the installation process, until the upper ends 101 are received in the grooves 45 of utility trough 17. Although only a single bracket 90 is illustrated in FIG. 2, it should be understood that a bracket 90 is attached to each lower end 88 of each outer web 83 of trestle 21, such that the trestle 21 is securely fastened to the upper horizontal frame member 5.

A horizontally repositionable, vertically extending utility support or "downspout" 25 is adapted to support utility lines such as data/phone lines 26 extending from the utilities passageway 19 of the utility trough 17 to an intermediate height 27 of the panel frame 3, wherein the intermediate 27 is generally located between the upper edge 18 of the panel frame 3, and the lower portion or base 13. The utility support member 25 is supported by the panel frame 3 at a selected one of a plurality of horizontal positions, such that the utility support member 25 can be readily positioned at a desired horizontal location with utility lines extending through the elongated opening 20 adjacent an upper end 28 of the utility support member 25, along the utility support member, and down to the intermediate height 27. Thus, the utility support member 25 permits routing of utility lines 26 from the utility trough 17 to an intermediate height 27 at a selected horizontal position.

Figure 2:
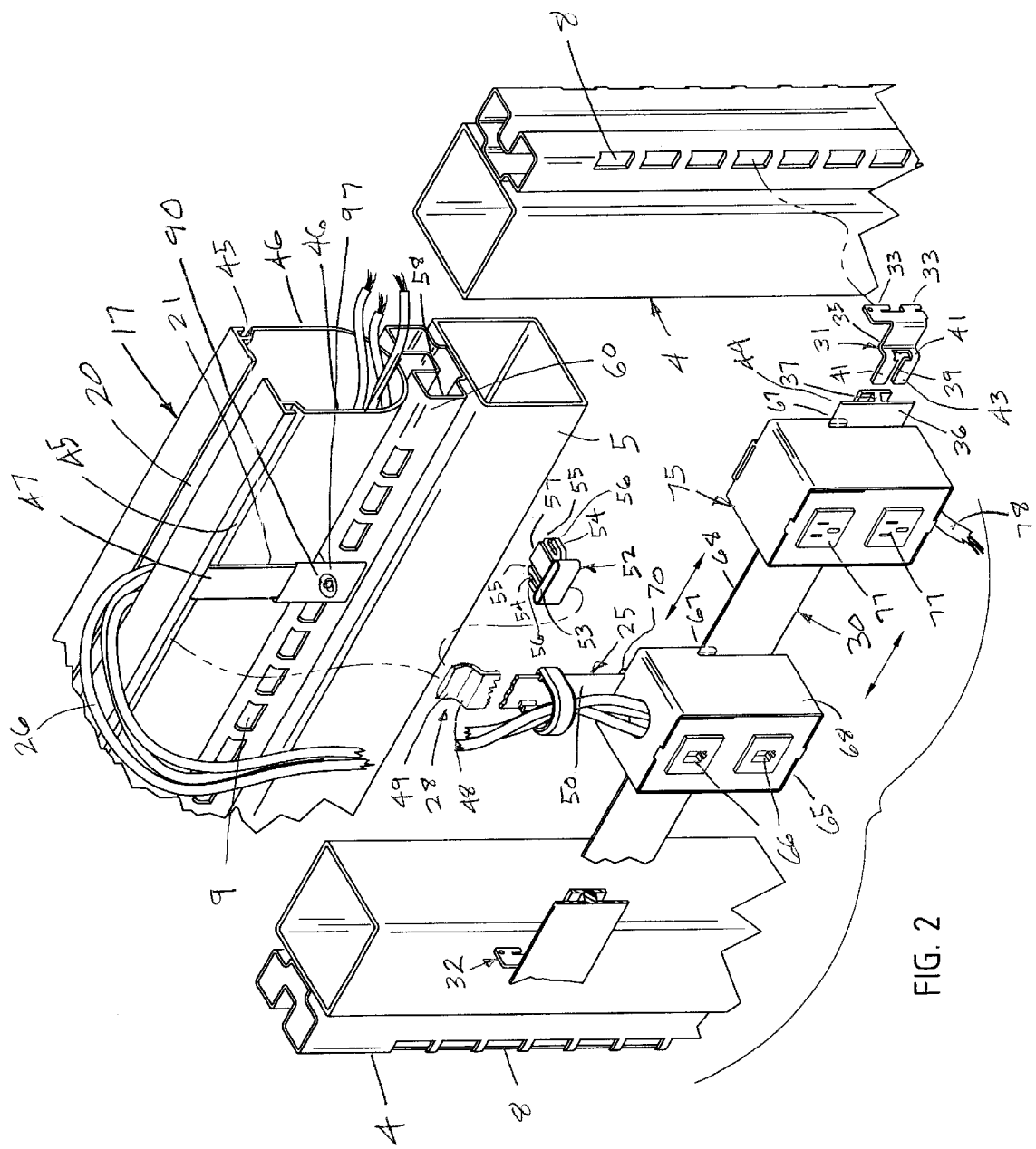
FIG. 2 is an exploded, fragmentary perspective view illustrating the utility trough, and data and power outlet assemblies of FIG. 1.

With further reference to FIG. 2, an elongated horizontal intermediate support member 30 is supported on the vertical frame members 4 by a pair of brackets 31 and 32. Bracket 32 is a mirror image of bracket 31, such that only bracket 31 will be described in detail herein. Bracket 31 includes hooks 33 extending from a web 34. Hooks 33 engage selected apertures 8 of upright 4, such that the vertical position of the bracket 31 and intermediate support member 30 relative to the panel frame 3 can be vertically adjusted. Intermediate support member 30 includes a first web 36, a transverse web portion 37, and a smaller second web 38 that is generally parallel to the first web 36. Bracket 31 includes an intermediate web 40 that extends generally transverse to the web 34. A transverse web portion 41 extends from intermediate web portion 40, and end web portions 42 and 43 extend from the web 41 and define a slot 39 therebetween. When assembled, the transverse web 37 of intermediate support member 30 is received in slot 39, and the second web 38 of intermediate support member 30 is received in the enlarged cutout 35 of bracket 31 to thereby support the intermediate support member on the brackets 31 and 32. The connecting arrangements between the intermediate support member 30 and the brackets 31 and 32 provides a moment-resisting connection that prevents rotation of the intermediate support member 30 about its horizontal axis. However, the intermediate support member 30 is horizontally slidable relative to the brackets 31 and 32, such that the horizontal position of the intermediate support member 30 can be adjusted. For example, if desired for a particular application, an end 44 of intermediate support member 30 may be extended outwardly, beyond the vertical frame member 4 in a cantilevered manner. Furthermore, as discussed above, the brackets 31 and 32 can be selectively engaged with the vertical row of apertures 8 to provide vertical adjustment of the position of the intermediate support member 30. In a preferred embodiment, the intermediate support member 30 is made of a polymer, extruded metal, or other suitable material.

Utility trough 17 is preferably made of PVC or other suitable polymer material, and may be made of a translucent or clear material such that the utility lines 26 are visible from the exterior of the utility troughs 17. Utility trough 17 includes a pair of elongated slots 45 extending along the sides 46 of utility trough 17. Slots 45 extend along the entire length of the utility trough 17 and receive the upper ends 47 of trestles 21 to support the utility trough 17 above the upper horizontal frame member 5. Utility support member 25 is preferably made of an elongated flat metal material, and includes an angled end portion 48 and an offset end portion 49 that is generally parallel to the main body 50 of the utility support member 25. During assembly, offset end portion 49 is inserted into a slot 45 while the main body portion 50 is angled outwardly away from panel frame 3. Main body portion 50 is then rotated towards frame 3 until the vertical position is reached. When assembled, the offset end 49 is received in a slot 45 of utility trough 17 to retain the upper end 28 of utility support member 25.

A retainer 52 (see also FIG. 5) is made of a polymer material, and includes an oblong opening 53. When assembled, the main body portion 50 of utility support member 25 is slidably received in the opening 53 of retainer 52. Retainer 52 includes a pair of flexible, elongated prongs 54, each of which includes a barbed end 55. Retainer 52 also includes a center tab 57, and a pair of outer prongs 56. When assembled, the center tab 57 and elongated prongs 54 are received in a selected one of the apertures 9, and the barbs 55 engage the inner sidewall 58 of horizontal frame member 5 to thereby retain the retainer 52 to the horizontal frame member 5. Outer prongs 56 are somewhat shorter than elongated prongs 54, such that the ends 59 of outer prongs 56 engage the outer surfaces 60 of horizontal frame member 5 when the retainer 52 is installed. Thus, the retainer 52 can be horizontally adjusted by engagement of the retainer 52 with a selected aperture 9.

A data outlet box assembly 65 includes one or more data receptacles 66 for phone lines, fax lines, computer lines, or other data connection lines. The box assembly 65 includes a box 68 formed from sheet metal. The box 68 includes a pair of downwardly opening hooks 67 that receive the upper edge 68 of first web 36 of intermediate support member 30, thereby supporting the data box assembly 65 on the intermediate support member 30. A slot 70 in box 68 receives lower end 69 of utility support member 25 to thereby support and position the utility support member 25. Thus, the horizontal position of the data box assembly 65 on the intermediate support member 30 can be readily adjusted by changing the engagement location of the offset end 49 of utility support member 25 in slot 45, as well as shifting the position of the retainer 52 to a selected aperture 9. The data box assembly 65 can likewise be selectively shifted along the intermediate support member 30 to provide the desired horizontal location.

A power outlet box assembly 75 is similarly supported on the intermediate support member 30 by a pair of hooks 67 to permit horizontal shifting of the power box assembly 75 to a selected location. The power box assembly 75 includes one or more electrical power receptacles or outlets 77, and a box 76 that is formed from sheet metal or the like. A power line 78 (see also FIG. 1) extends downwardly, and includes a standard electrical plug or connector 79 that plugs into the standard power outlet 15 positioned along the base 13 of the partition panel 2. Thus, the power box assembly 75 permits routing of electrical power lines 78 from the base 13 to an intermediate height 27. The horizontal position of power box assembly 75 can be readily adjusted by shifting the power box assembly 75 along support member 30.

Significantly, the vertical positioning of both the data outlets and the power outlets can be shifted by changing the position of the intermediate support member 30, and the horizontal position of the electrical and data outlets can also be adjusted by shifting of the data box assembly 65 and/or power box assembly 75 along the intermediate support member 30. In a preferred embodiment, the partition system 1 includes a plurality of cover panels 23 that attach to the panel frames 3 in a conventional manner to form the partition panels 2. However, the intermediate support member 30 permits positioning of the data outlet box assembly 65 and/or power box assembly 75 regardless of whether or not the cover panels 23 are utilized. The intermediate support member 30 and utility support member 25 permit routing of utility lines 26 and power lines 78 to intermediate height 27 regardless of whether or not the cover panels 23 are present. Thus, if desired for a particular application, the cover panels 23 may be left off to provide an open frame system while still providing both power and data outlets adjacent worksurface 7 to thereby provide power and/or data capabilities for a computer 80, phone 81, or other such office equipment.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A partition panel, comprising:
    a rigid panel frame having a lower portion configured to support said partition panel free standing on a floor surface, said rigid panel frame defining a horizontal upper edge and an intermediate height between said upper edge and said lower portion;
    a utility trough extending horizontally adjacent said horizontal upper edge, said utility trough defining a utilities passageway and having an upwardly facing elongated opening extending along substantially the entire length of said utility trough and providing access to said utilities passageway;
    a horizontally repositionable vertically extending utility support member adapted to support utility lines extending from said utilities passageway of said utility trough to said intermediate height, said utility support member supported by said panel frame at a selected one of a plurality of horizontal positions, such that said utility support member can be readily repositioned at a desired horizontal location relative to said panel frame with utility lines extending through said elongated opening adjacent an upper end of said utility support member, along said utility support member down to said intermediate height.

2. The partition panel of claim 1, wherein:
    said utility trough is vertically spaced above said horizontal upper edge.

3. The partition panel of claim 2, wherein:
    said utility trough includes an elongated horizontally extending connecting structure;
    said utility support member having an upper end connected to said connecting structure.

4. The partition panel of claim 3, wherein:
    said rigid panel frame includes a horizontally extending upper frame member adjacent said upper edge; and
    said utility support member is releasably secured to said upper frame member.

5. The partition panel of claim 4, wherein:
    said upper frame member includes horizontally extending apertures; and including:
    a bracket connected to said utility support member, said bracket including a pair of elongated flexible prongs, each prong having a barbed end portion received in selected ones of said apertures to removably retain said bracket.

6. The partition panel of claim 1, wherein:
    said partition panel includes a base portion with a horizontally extending powerway;
    said partition panel further including a horizontally extending intermediate support member positioned between said upper edge and said lower portion; and including:
    an electrical power outlet supported on said intermediate support member and electrically connected to said electrical powerway.

7. The partition panel of claim 6, wherein:
    said electrical power outlet includes at least one hook removably supporting said electrical power outlet on said intermediate support member.

8. The partition panel of claim 6, including:
    a data outlet supported by said intermediate support member;
    at least one data line, at least a portion of which is disposed in said utility trough, said data line extending downwardly from said utility trough and connecting to said data outlet.

9. The partition panel of claim 8, wherein:
    said panel frame includes a pair of spaced apart upright frame members, each having a vertical row of apertures;
    said intermediate support member including hooks that are received in selected ones of said apertures, such that the vertical position of said intermediate support can be adjusted.

10. A partition panel for spatially dividing an interior building space, comprising:
    a rigid partition frame including a lower portion configured to support said partition frame on a floor surface in an upright position, and defining a generally horizontal upper edge;
    an electrical powerway adapted to conduct electricity, said electrical powerway extending along a lower portion of said partition frame, said electrical powerway including at least one power outlet positioned adjacent said lower portion of said partition frame;
    an upper communications raceway extending generally horizontally adjacent said upper edge of said partition frame and including at least one communications line extending along said communications raceway;
    an intermediate support member positioned between said lower portion and said upper edge, said intermediate support member being adjustably connected to said rigid partition frame such that said intermediate support member can be supported by said rigid partition frame at a selected one of a plurality of vertically spaced locations;

an electrical power receptacle electrically connected to said electrical powerway and supported on said intermediate support member; and a communications receptacle operably connected to said communications line and supported on said intermediate support member.

11. The partition panel of claim 10, wherein:

said communications raceway comprises an upwardly opening utility trough having a U-shape in cross section.

12. The partition panel of claim 11, including:

an elongated vertically extending utility support;

said communications line extending from said utility trough to said communications receptacle along said utility support.

13. The partition panel of claim 12, wherein:

said partition frame includes at least two vertically extending rows of apertures, said intermediate support member having hooks received in said apertures to support said intermediate support member.

14. The partition panel of claim 13, wherein:

said partition frame includes a horizontally extending upper frame member adjacent said horizontal upper edge, said upper frame member including horizontally extending apertures; and including:

a bracket connected to said utility support member, said bracket including a pair of elongated flexible prongs, each prong having a barbed end portion received in selected ones of said apertures to removably retain said bracket.

15. An office environment partition system for spatially dividing an interior space having a floor and for supporting furniture units, said partition system comprising:

a partition panel having a rigid frame with a height and a width and repositionably located on the floor, said rigid frame including at least two vertical members having attachment sites extending along a portion of the vertical length of each of said vertical members, said attachment sites configured to provide the selective mounting of the furniture units thereto; said partition panel including an electrical power raceway operatively connected to electrical power outlets accessible from the exterior of said panel partition;

a support member detachably secured to said attachment sites and having a horizontal length extending between said two vertical members; said support member being vertically repositionable at selected heights on said partition panel; and an electrical power outlet housing assembly detachably supported by said support member, said housing being repositionable along a substantial portion of said horizontal length of said support member, said electrical power outlet housing being operably connectable to said electrical power raceway whereby electrical power is supplied to said electrical power outlet housing assembly from said electrical power raceway.

16. The partition system of claim 15, wherein:

said support member comprises a substantially linearly continuous horizontally extending upper edge and said outlet housing includes hooked projections which are engageable with said support member upper edge.

17. The partition system of claim 15, wherein:

said electrical power outlet housing is operably connected to said electrical power raceway at said externally accessible electrical power outlets.

18. The partition system of claim 15, wherein:

said outlet housing is positionable at a combination of varying heights and horizontal positions which cover a substantial portion of the surface area defined by the height and width of said rigid frame.

19. The partition system of claim 15, wherein:

a substantial portion of the surface area defined by the height and width of said rigid frame is open to passage of physical objects through said panel.

20. The partition system of claim 15, wherein:

said horizontal length of said support member is substantially equivalent to said width of said partition panel.

* * * * *